(12) United States Patent
Oomori et al.

(10) Patent No.: US 9,404,016 B2
(45) Date of Patent: Aug. 2, 2016

(54) LAMINATED BODY

(71) Applicant: Toppan Printing Co., Ltd., Tokyo (JP)

(72) Inventors: Yumiko Oomori, Tokyo (JP); Kazuko Imai, Tokyo (JP); Mitsuharu Kimura, Tokyo (JP); Kosuke Shimizu, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 523 days.

(21) Appl. No.: 13/901,503

(22) Filed: May 23, 2013

(65) Prior Publication Data

US 2013/0260143 A1    Oct. 3, 2013

Related U.S. Application Data

(63) Continuation of application No. PCT/JP2011/076386, filed on Nov. 16, 2011.

(30) Foreign Application Priority Data

Nov. 25, 2010    (JP) .................................. 2010-262204

(51) Int. Cl.
*B32B 5/02* (2006.01)
*B32B 7/10* (2006.01)
(Continued)

(52) U.S. Cl.
CPC .............. *C09D 167/00* (2013.01); *C08B 15/02* (2013.01); *C09D 101/02* (2013.01); *C09D 101/04* (2013.01); *C09D 105/08* (2013.01); *C09D 123/26* (2013.01); *C09D 133/00* (2013.01); *C09D 133/06* (2013.01); *C09D 151/06* (2013.01); *C09D 175/04* (2013.01); *B32B 5/02* (2013.01); *B32B 7/10* (2013.01);
(Continued)

(58) Field of Classification Search
None
See application file for complete search history.

(56) References Cited

U.S. PATENT DOCUMENTS

2008/0000603 A1 *  1/2008  Neogi ................... D21H 11/20
                                                              162/182
2010/0316863 A1 * 12/2010  Kumamoto .............. C08J 7/047
                                                              428/292.1

FOREIGN PATENT DOCUMENTS

CN         101272904 A      9/2008
JP         2003306346       10/2003
(Continued)

OTHER PUBLICATIONS

First Office Action of the Chinese patent application 2011800377888 and its translation, mailed Sep. 2, 2014, 15 pgs.
(Continued)

*Primary Examiner* — Ramsey Zacharia
(74) *Attorney, Agent, or Firm* — Squire Patton Boggs (US) LLP

(57) ABSTRACT

The invention makes it possible to use a coating liquid of a fine cellulose fiber (a natural material) and to form a coated layer which can be used as a various-functions layer such as a gas barrier layer and water vapor barrier layer etc. by achieving good adhesiveness and coatability of the coating liquid, and as a result, provides a laminated material in which temporal degradation of a substrate and the fine cellulose fiber layer is prevented. The laminated body includes a substrate, an anchor layer arranged on a surface the substrate, and a fine cellulose fiber layer containing a fine cellulose fiber having a carboxy group, wherein the anchor layer contains at least one resin having a carboxy group, sulfonate group, amino group or hydroxyl group.

9 Claims, 1 Drawing Sheet

(51) Int. Cl.
  *C08B 15/02* (2006.01)
  *C09D 167/00* (2006.01)
  *C09D 123/26* (2006.01)
  *C09D 175/04* (2006.01)
  *C09D 105/08* (2006.01)
  *C09D 133/00* (2006.01)
  *C09D 101/02* (2006.01)
  *C09D 101/04* (2006.01)
  *C09D 133/06* (2006.01)
  *C09D 151/06* (2006.01)

(52) U.S. Cl.
  CPC ....... *Y10T 428/265* (2015.01); *Y10T 428/3179* (2015.04); *Y10T 428/3188* (2015.04); *Y10T 428/31515* (2015.04); *Y10T 428/31591* (2015.04); *Y10T 428/31779* (2015.04); *Y10T 428/31971* (2015.04)

(56) References Cited

FOREIGN PATENT DOCUMENTS

| | | |
|---|---|---|
| JP | 2008-001728 | 1/2008 |
| JP | 2009-057552 | 3/2009 |
| JP | 2010-167411 | 8/2010 |
| JP | 2010-184999 | 8/2010 |
| JP | 2011-207042 | 10/2011 |
| WO | WO 2009020239 A1 * 2/2009 | ............... C08J 7/047 |

OTHER PUBLICATIONS

Translated International Preliminary Report on Patentability for PCT/JP2011/076368, mailed Jun. 20, 2013, 8 pgs.

Notification of Reasons for Rejection for JP application No. 2012-545696, dispatched May 12, 2015, 2 pgs.

Translation of the Notification of Reasons for Rejection for JP application No. 2012-545696, dispatched May 12, 2015, 2 pgs.

* cited by examiner

LAMINATED BODY

This application is a continuation of International Application No. PCT/JP2011/076368, filed Nov. 16, 2011, which is incorporated herein by reference in its entirety.

BACKGROUND OF THE INVENTION

1. Field of the Invention

The present invention relates to a laminated body of cellulose fine fiber which can be used as a coating agent or a functional layered material etc. The invention also relates to a manufacturing method of such a laminated body.

2. Description of the Related Art

In recent years as concerns about environmental problems grow, various kinds of natural polysaccharide such as naturally-derived starch, cellulose, chitin and chitosan etc. and their derivatives have attracted attention as a biomass. In addition, basic materials made of a biodegradable resin, which is environmentally degradable to water and carbon dioxide, also attracts attention, and are commercially supplied. Specific examples are microbial aliphatic polyesters, various kinds of natural polysaccharide such as naturally-derived starch, cellulose, chitin and chitosan etc. and their derivatives, biodegradable resins fully-synthesized by a chemical method, and a PLA (polylactate) obtained by polymerizing lactic acid made from starch etc.

Among these, cellulose, which is produced most on the earth, attracts attention because of fibrous form, high crystallinity, a high level of strength, a low linear expansion coefficient, chemical stability and excellent safeness for a living body. In particular, fine cellulose fibers have been eagerly developed in recent years at the prospect of being used as various kinds of functional materials such as a wrapping (or packaging) material etc.

Regarding manufacturing method of a fine cellulose fiber, for example, a method of obtaining the fine cellulose fiber by oxidizing some of the hydroxyl groups in cellulose with TEMPO (2,2,6,6-tetramethylpiperidinyloxy radical) as a catalyst followed by dispersing the resultant oxidized cellulose in a medium is disclosed in the Patent document 1 below. This method makes it possible with relative ease to obtain a fine cellulose fiber having a crystal structure of cellulose I type by utilizing electric repulsions between negatively-charged carboxy groups.

In addition, the Patent document 2 discloses a method of dispersing the oxidized cellulose by the TEMPO oxidation to prepare a gas barrier material containing fine cellulose fiber with an average diameter of 200 nm or less, followed by coating the gas barrier material on a substrate such as PET film and PLA etc. and drying the resultant material so as to obtain a formed-composite having gas impermeability.

Patent document 1: JP-A-2008-1728.
Patent document 2: JP-A-2009-57552.

However, films made from an aqueous dispersion liquid of fine cellulosed fiber as is described above have problems of low adhesion to the substrate due to their low reactivity and a small area of contact to the substrate, which is caused by a rigid nature, high elastic modulus and fibrous shape of the fine cellulose fiber. In addition, there are also problems in terms of repellency, wettability, inhomogeneity and coatability since polar groups such as carboxy group etc. are often introduced to the fine cellulose fiber and an aqueous solvent is usually used. For example, the low adhesion to the substrate causes delamination when the films are formed on the substrate as a layer of a laminate. In addition, the problems of repellency, wettability and inhomogeneity and low coatability further causes a problem of difficulty in obtaining a continuous and homogenous film, a problem of low printability and processing suitability, a problem of poor optical properties, and a problem of difficulty in obtaining good performance when the formed film is used as a barrier material. Moreover, in the case where paper or PLA etc. is used as the substrate, the substrate and the formed film may degrade as time passes and their adhesion may become worse since paper and PLA etc. are a natural product, which are known to have less wettability to the aqueous solvent and less adhesion to the formed film than petroleum-derived synthetic-resins. Accordingly, it has been difficult to evenly coat an aqueous dispersion liquid of fine cellulose fiber on a substrate, and further, to achieve adhesion to the substrate. Moreover, it has been also difficult to ensure adhesiveness and to prevent degradation of the substrate and the fine cellulose fiber even after time passes.

SUMMARY OF THE INVENTION

The present invention has been made considering the problems described above. It is an object of the present invention to provide a laminate material in which a film substrate particularly a naturally-derived material such as PLA etc. is used as a substrate, wherein a coating liquid of fine cellulose fiber as a natural material is used as a coating material, wherein a layer of the coating material (in other words, a layer of the fine cellulose fiber) is formed for the use as a coated layer of various functional materials such as a gas barrier layer and moisture barrier layer etc. retaining good adhesiveness and coatability, and wherein time degradation of the substrate and the layer of the fine cellulose fiber is inhibited.

In order to solve the problems described above, a first aspect of the present invention is a laminated body including a substrate, an anchor layer and a fine cellulose fiber layer, the anchor layer and the fine cellulose fiber layer being arranged on a surface of the substrate in this order, the fine cellulose fiber layer containing a fine cellulose fiber having a carboxy group, wherein the anchor layer contains a resin having at least one of functional groups consisting of the group of carboxy group, sulfonate group, amino group and hydroxyl group.

In addition, a second aspect of the present invention is the laminated body according to the first aspect of the present invention, wherein the fine cellulose fiber is oxidized cellulose in which carboxy groups are introduced by an oxidation reaction and its content of the carboxy groups is in the range of 0.1-5.5 mmol/g.

In addition, a third aspect of the present invention is the laminated body according to the second aspect of the present invention, wherein the fine cellulose fiber has a number average fiber diameter in the range of 0.001-0.200 µm.

In addition, a fourth aspect of the present invention is the laminated body according to the third aspect of the present invention, wherein the carboxy groups in the fine cellulose fiber form ammonium salts or amine salts.

In addition, a fifth aspect of the present invention is the laminated body according to the third aspect of the present invention, wherein the resin contained in the anchor layer is a polyester resin, a polyamide resin, a polyurethane resin, a polyacrylic acid resin, a polyolefin resin or a copolymer of these.

In addition, a sixth aspect of the present invention is the laminated body according to the third aspect of the present invention, wherein the anchor layer contains a resin having a carboxy group, and the carboxy group forms an ammonium salt or an amine salt.

In addition, a seventh aspect of the present invention is the laminated body according to the fifth aspect of the present invention, wherein the anchor layer further contains a reactive compound having a carbodiimide group, oxazoline group, isocyanate group or epoxy group.

In addition, an eighth aspect of the present invention is the laminated body according to the seventh aspect of the present invention, wherein the substrate consists of polyester resin and wherein the anchor layer contains a polyester resin having a carboxy group and a reactive compound having a carbodiimide group or an oxazoline group.

In addition, a ninth aspect of the present invention is the laminated body according to the eighth aspect of the present invention, wherein the polyester resin of the substrate is a polylactate.

In addition, a tenth aspect of the present invention is the laminated body according to the seventh aspect of the present invention, wherein the reactive compound has a molecular weight of 1000 or more.

In addition, an eleventh aspect of the present invention is the laminated body according to the seventh aspect of the present invention, wherein the resin contained in the anchor layer has an acid value of 12 or more.

In addition, a twelfth aspect of the present invention is the laminated body according to the eleventh aspect of the present invention, wherein the anchor layer has a thickness in the range from 3 nm to 10 μm.

In addition, a thirteenth aspect of the present invention is a manufacturing method of a laminated body, the laminated body including a substrate, an anchor layer and a fine cellulose fiber layer, the fine cellulose fiber layer containing a fine cellulose fiber having a carboxy group, the anchor layer and the fine cellulose fiber layer being arranged on a surface of the substrate, the manufacturing method including a process of forming a coated layer on a surface of the substrate using a coating liquid which contains at least one resin having a carboxy group, sulfonate group, amino group or hydroxyl group and a reactive compound having a carbodiimide group, oxazoline group, isocyanate group or epoxy group, a process of forming the anchor layer by drying the coated layer at 80° C. or lower, and a process of forming the fine cellulose fiber layer on the anchor layer.

The present invention makes it possible to provide a laminate material in which cellulose, a natural resource with little environmental load, is effectively utilized and a coated layer of various functionalities such as gas barrier and moisture barrier etc. is formed. In the present invention, it is possible to form the coated layer on a substrate ensuring coatability and adhesiveness.

In particular, the present invention makes it possible to provide a laminate material in which a layer of fine cellulose fiber is formed on a substrate ensuring coatability and adhesiveness even if a film substrate and a PLA substrate etc. are used as the substrate, and time degradation of an adhesion between the substrate and the layer of fine cellulose fiber is decreased. As a result, a laminate body with improved weather resistance, heat resistance and waterproofness can be obtained.

DESCRIPTION OF SYMBOLS AND NUMERALS

Figure 1:
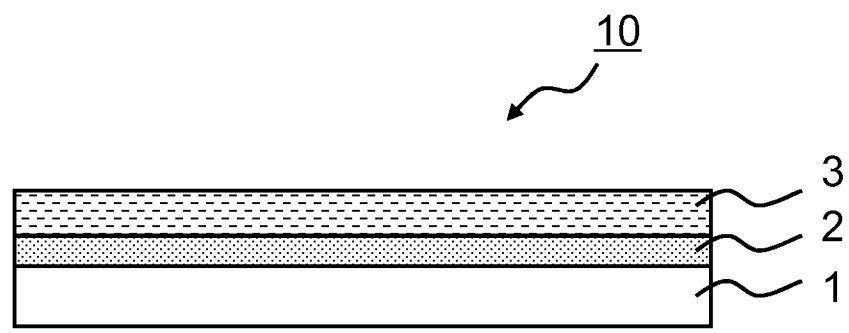
FIG. 1 is a cross sectional schematic diagram of a laminated body of an embodiment of the present invention.

1: Substrate
2: Anchor layer
3: Layer of fine cellulose fiber (Fine cellulose fiber layer)
4: Adhesion layer
5: Thermoplastic layer
10 and 20: Laminated body Embodiment of the Invention An embodiment of the present invention is described below.

A laminated body 10 of the present invention has a laminate structure sequentially including at least a substrate 1, and an anchor layer 2 and a fine cellulose fiber layer 3 which contains a fine cellulose fiber having a carboxy group on a surface of the substrate 1. The anchor layer 2 and the fine cellulose fiber layer 3 may be formed on both surfaces of the substrate 1.

First, the fine cellulose fiber layer 3 is described. The fine cellulose fiber layer contains at least a fine cellulose fiber having a carboxy group. It is possible to make the fine cellulose fiber having a carboxy group in the following way, for example.

<Raw Material>

A cellulose material is used as the raw material. The cellulose material may undergo a treatment such as pulverizing, blasting, swelling, purifying, bleaching, dissolving and reclaiming, and treating with alkali etc. In particular, it is preferable that naturally-derived cellulose, which has a crystalline structure of cellulose I, is used as the cellulose material in order to obtain a coated layer with high gas barrier properties or high strength. Wood pulp, non-wood pulp, cotton pulp, bacterial cellulose and sea squirt cellulose etc. are examples of the naturally-derived cellulose used as the raw material.

<Method of Introducing a Carboxy Group>

It is possible to use a generally-known method of chemical reforming as a method of introducing a carboxy group into cellulose. For example, it is possible to select a method out of the following: a method of introducing a carboxy group by esterizing or etherizing (namely, transforming into ester or ether) a hydroxyl group of cellulose, which is known in carboxymethylation, a method of introducing a carboxy group by oxidizing the hydroxyl group, etc.

Among these, a method of using a nitroxyl radical derivative as a catalyst and hypohalous acid salt or halous acid salt etc. as a co-oxidant is particularly preferable in order to obtain a coated layer with high gas barrier properties and/or to introduce the carboxy group without deforming or destroying the crystalline structure. In particular, a TEMPO oxidation which is performed in an aqueous medium containing sodium hypochlorite and sodium bromide under an alkaline condition preferably at a pH in the range from 9 to 11 using TEMPO (2,2,6,6-tetramethylpiperidinyloxy radical) as the catalyst is desirable in points of availability of reagents, costs and reaction stability. In this TEMPO oxidation, the pH of the reaction system should be kept unchanged by adding alkaline solution as needed because alkali is consumed as the reaction proceeds.

By the TEMPO oxidation, a carboxy group is introduced since a hydroxyl group on carbon 6 of a pyranose ring (glucose) in cellulose is selectively oxidized to an aldehyde group, which is further oxidized to the carboxy group. In addition, in the case where a naturally-derived cellulose is used for the TEMPO oxidation, the oxidation proceeds only on a surface of a crystalline microfibril, a building block of cellulose, whereas the inside of the crystal is not oxidized. As a result, it is possible to obtain a fine cellulose fiber retaining the crystalline structure of cellulose I so that the resultant fine cellulose fiber has characteristics such as high heat resistance, low linear expansion coefficient, high elastic modulus and high strength etc.

Reagents used for the TEMPO oxidation are commercially available with ease. The reaction preferably proceeds at a temperature in the range of 0-60° C., and it is possible to convert the cellulose into fine fibers and to sufficiently introduce carboxy groups to acquire dispersibility in a time in the range of about 1-12 hours.

Only a catalyst quantity of TEMPOs and sodium bromide are required for the reaction, and it may be possible to collect them after the reaction. In addition, since the only theoretical by-product of the reaction system described above is sodium chloride, it is easy to dispose of a liquid waste loading a small environment burden.

It is possible to control an amount of the introduced carboxy groups by appropriately adjusting conditions for the TEMPO oxidation. The cellulose fibers cannot be stably dispersed in the aqueous medium when excessively few carboxy groups are introduced because the cellulose fibers are dispersed in the aqueous medium with electric repulsions between the carboxy groups by a process of dispersing treatment described later. On the other hand, when excessively many carboxy groups are introduced, the cellulose fibers are provided with high affinity for water and low waterproofness. In this point of view, the amount of the introduced carboxy groups is preferably in the range of 0.1-5.5 mmol/g, more preferably in the range of 0.1-3.5 mmol/g and still more preferably in the range of 0.6-2.5 mmol/g. In the process of introducing the carboxy groups, aldehyde groups are produced as an intermediate of the oxidation, and some of the aldehyde groups remain in the final product. Since an excessively large amount of aldehyde groups causes problems such as a decrease in dispersibility of the cellulose fibers and discoloration after transforming into a film etc, it is preferable that the amount of the aldehyde groups is 0.3 mmol/g or smaller.

The oxidation is terminated by adding an excess amount of another alcohol to fully consume the co-oxidant in the system. In order to stop the reaction at once, it is desirable that an alcohol with a low molecular weight such as methanol, ethanol and propanol etc. are used. Among these, ethanol is preferable if considering safety and a by-product of the oxidation.

<Collection of Oxidized Cellulose>

It is possible to collect the resultant oxidized cellulose from the reaction solution by filtration after stopping the oxidation. The carboxy group after stopping the oxidation forms a salt together with a counter ion of a metal ion originally present in the co-oxidant or the inorganic alkali used for pH adjustment. Examples of a collecting method are a method of separating the oxidized cellulose as the salt of the carboxy group by filtration, a method of adding an acid to the reaction solution to adjust its pH to 3 or lower so as to make the carboxy group to form a carboxylic acid and to separate the oxidized cellulose by filtration, and a method of adding an organic solvent to agglutinate the oxidized cellulose and separating it by filtration. Among these, it is preferable to use the method of making the carboxy group to form a carboxylic acid and to separate the oxidized cellulose by filtration, in terms of handleability, yield and liquid waste disposal. In addition, this method is preferable for another reason that an oxidized cellulose without a metal ion is more solvent-miscible than an oxidize cellulose containing a metal ion as the counter ion considering a preparation of a fine cellulose fiber composition, which is described later.

It is possible to measure a content of the metal ion contained in the oxidized cellulose by various analyzing methods. For example, it is conveniently possible to measure it by an EPMA method utilizing an electron beam microanalyzer or by an elemental analysis by a fluorescent X-ray analysis method. The content (rate) of the metal ion is 5 wt % or more when the oxidized cellulose is separated as the salt of the carboxy group by filtration whereas the content of the metal ion is 1 wt % or less when the oxidized cellulose is separated by filtration after making the carboxy group to form a carboxylic acid. In particular, the content of the metal ion is less than a detection limit when the oxidized cellulose is further washed by a method described below.

<Washing>

It is possible to refine the oxidized cellulose by repeated washing after collecting. The catalyst, sodium chloride as the by-product, and residues such as ions etc. are removed. At this moment, it is preferable to use water as a washing liquid. In addition, it is possible to remove residual metal ions to less than a detection limit by an analyzing method described above if washing with water is performed after performing washing under an acidic condition at a pH of 3 or lower, more preferably a pH of 1.8 or lower, using hydrochloric acid etc. Alternatively, it is also possible to perform washing under the acidic condition for two or more times in order to further reduce the residue of metal ions. In addition, it is preferable to repeat washing with water because it becomes more difficult to disperse the oxidized cellulose in a dispersion process described below if a salt etc. remains in the cellulose.

Next, a process of dispersing the oxidized cellulose to prepare a dispersion liquid of fine cellulose fiber is described.

<Dispersion Process>

In a process of fiberizing the oxidized cellulose into fine fibers after washing, firstly the oxidized cellulose is immersed in an aqueous medium as a dispersion medium. At this moment, the liquid in which the oxidized cellulose is immersed has a pH of, for example, 4 or lower. Since the oxidized cellulose is insoluble to the aqueous medium, an inhomogeneous suspension is obtained just after immersing the oxidized cellulose.

The suspension of the oxidized cellulose preferably has a solid content concentration of oxidized cellulose of 10 wt % or lower, and 5 wt % or lower is more preferable. The suspension is favorable in terms of dispersibility and transparency if the solid content concentration is 5 wt % or lower, particularly 3 wt % or lower. When the solid content concentration exceeds 10 wt %, it is difficult to perform a dispersing treatment since a viscosity of the dispersion liquid seriously increases. As to a lower limit, the suspension can have any level of solid content concentration more than 0 wt % since there is no particular limitation.

Subsequently, the suspension of the oxidized cellulose is adjusted to have a pH in the range of 4-12 using an alkali. Particularly, the pH is adjusted into an alkaline region in the range of 7-12 to form a carboxylate. Then, since electrical repulsions between the carboxy groups frequently occur and thereby improves dispersibility, it becomes easy to obtain a fine cellulose fiber. In fact, it is possible to fiberize the oxidized cellulose into the fine cellulose fiber even at a pH of 4 or lower if a mechanical dispersion treatment is performed. In such a case, however, it takes a longer time and it requires a higher energy to fiberize, and in addition, only a rougher fiber is obtained and the dispersion liquid has less transparency than in the case of the present invention. On the other hand, if the pH is higher than 12, only a formed film with inferior strength and transparency is obtained because the oxidized cellulose tends to have a lower molecular weight due to β elimination reaction and discoloration of the dispersion liquid to a yellowish color is promoted.

Various kinds of inorganic alkali such as sodium hydroxide, lithium hydroxide and potassium hydroxide etc. can be used as the alkali. Alternatively, it is also possible to adjust the pH using aqueous ammonia or an organic alkali. Examples of the organic alkali are an amine such as various kinds of aliphatic amines, aromatic amines and diamines etc., a quaternary ammonium compound which has a hydroxyl ion as a counter ion and has a composition of $NR_4OH$ (wherein R is any one of the groups consisting of an alkyl group, a benzyl group, a phenyl group and a hydroxyalkyl group, and any two, three or all of the Rs can be the same although all of the Rs may be different to one another.) such as tetramethylammonium hydroxide, tetraethylammonium hydroxide, tetra-n-butylammonium hydroxide, benzyltrimethylammonium hydroxide and 2-hydroxyethyltrimethylammonium hydroxide etc., an organic onium compound which contains a hydroxyl ion as a counter ion such as phosphonium hydroxide compounds for example tetraethylphosphonium hydroxide etc., oxoium hydroxide compounds and sulfonium hydroxide compounds etc. Regardless of the kinds of alkali, it is possible to fiberize into fine fibers by a dispersion treatment similar to the case where an inorganic alkali is used even if the organic alkali is used.

Particularly in the case where an organic alkali is used as the alkali, the dispersion treatment can be conducted in a shorter time with a lower energy and a resultant dispersion liquid with a higher transparency is obtained than in the case where an inorganic alkali which contains a metal ion as a counter ion is used. This is because the organic alkali contains a counter ion having a larger ion radius, thereby effectively isolating the fine cellulose fibers from one another in the dispersion liquid.

Furthermore, since an organic alkali has a high level of affinity for an organic solvent, it becomes possible to prepare the fine cellulose fiber dispersion liquid using an organic solvent such as an alcohol as the dispersion medium if an organic alkali is employed. Furthermore, it is also possible to add an organic solvent to the fine cellulose fiber dispersion liquid in which an aqueous medium is used as the dispersion medium and a dispersion treatment is performed. Examples of the aqueous medium are water and a solvent mixture of water and an organic solvent. Examples of the organic solvent are an alcohol such as methanol, ethanol and 2-propanol (IPA) etc., ketones such as acetone and methylethylketone (MEK) etc., ethers such as 1,4-dioxane and tetrahydrofuran (THF) etc., N,N-dimethylformamide (DMF), N,N-dimethylacetoamide (DMAc), dimethylsulfoxide (DMSO), acetonitrile, ethyl acetate and glycerin etc. Two or more of these together as well as any one of these alone can be used as the organic solvent.

Moreover, an organic alkali is more advantageous and makes it easier than an inorganic alkali to perform the dispersion treatment and to conduct coating in a coating process described later because viscosity and thixotropic nature of the fine cellulose fiber dispersion liquid are reduced when the organic alkali is used. A larger energy is required and it becomes harder to conduct the dispersion treatment as it has a higher concentration because the fine cellulose fiber dispersion liquid normally turns to a gel and its viscosity increases. In the case where the organic alkali is used, it is easy to conduct the dispersion treatment since viscosity of the fine cellulose fiber dispersion liquid is low. It is possible to control the viscosity characteristics and to improve coatability of the dispersion liquid by selecting a combination of the organic alkali and the solvent.

In addition, in the case where a compound which reacts with the carboxy groups such as a carbodiimide group, an oxazoline group, an epoxy group and an amino group etc. is contained in the anchor layer 2 as is described later, it is highly effective to improve adhesiveness and to prevent time degradation if particularly an organic alkali having a low boiling point such as ammonia and triethylamine etc. is used as the alkali for the fine cellulose fiber dispersion liquid because the organic alkali vaporizes while drying after being coated or the subsequent processes of aging and curing so that reactivity of the carboxy groups is increased and their reaction with the reactive compound contained in the anchor layer 2 proceeds. For this reason, it is preferable that the carboxy groups of the fine cellulose fiber contained in the fine cellulose fiber layer form ammonium salts or amine salts, which are reactive, rather than form inorganic salts, which are derived from the inorganic alkali. Examples of the amine salts are a triethylamine salt and a tetramethylamine salt etc.

In addition, it is also preferable if the carboxy group in the fine cellulose fiber does not form a salt and exists as a carboxy group, namely in a state of "—COOH", because the reaction easily proceeds.

Various dispersion treatments already known can be used as the method of the dispersion treatment for the oxidized cellulose suspension. Examples of such dispersion treatments are homomixer treatment, treatment with a mixer having a rotary blade, high-pressure homogenizer treatment, ultra-high-pressure homogenizer treatment, ultrasonic homogenizer treatment, nanogenizer treatment, disc refiner treatment, conical refiner treatment, double-disc refiner treatment, grinder treatment, ball mill treatment, kneading treatment with a two-axis kneading machine and treatment of aqueous counter collision etc. Among these, the treatment with a mixer having a rotary blade, the high-pressure homogenizer treatment, the ultrahigh-pressure homogenizer treatment and the ultrasonic homogenizer treatment are preferable in terms of fiberizing efficiency. Incidentally, it is also possible to conduct dispersing by combining two or more of these treatments.

The oxidized cellulose suspension after the dispersion treatment visually becomes a homogeneous and transparent dispersion liquid. The oxidized cellulose is fiberized into a fine cellulose fiber by the dispersion treatment.

The fine cellulose fiber after the dispersion treatment has a number average fiber diameter (in a direction of the short axis) preferably in the range of 0.001-0.200 µm, and more preferably in the range of 0.001-0.050 µm. It is possible to confirm the number average fiber diameter of the fine cellulose fiber by a scanning electron microscope (SEM) or an atomic force microscope (AFM). After forming a film from a coating liquid containing the fine cellulose fiber, the film has a problem of poor transparency, smoothness and/or flatness if the dispersion is so insufficient and/or so inhomogeneous that some fibers with a large fiber diameter remain.

The fine cellulose fiber dispersion liquid described above, as it is or by further adding a publicly known resin and/or solvent, can be used as the coating liquid containing the fine cellulose fiber described above. Alternatively, a coating liquid prepared by isolating the fine cellulose fiber from the fine cellulose fiber dispersion liquid and admixing the publicly known resin and/or solvent can also be used as the coating liquid containing the fine cellulose fiber described above.

The fine cellulose fiber layer is formed by coating the coating liquid containing the fine cellulose fiber. Since there is no particular limitation to a method for coating the coating liquid containing the fine cellulose fiber, a publicly known coating method or casting method etc. can be used. Examples of the coating method are gravure coating method, gravure reverse coating method, roll coating method, reverse roll coating method, micro gravure coating method, comma coating method, air knife coating method, bar coating method, Mayer bar coating method, dip coating, die coating and spray coating, etc. Any of these can be used.

The fine cellulose fiber layer has a thickness preferably in the range of 0.05-20 µm and more preferably in the range of 0.1-2 µm. If the fine cellulose fiber layer has a thickness larger than 20 µm, workability or processability may be insufficient. If the fine cellulose fiber layer has a thickness smaller than 0.05 µm, gas barrier properties may become poor.

Besides the fine cellulose fiber having a carboxy group, the fine cellulose fiber layer may contain various kinds of additives such as an inorganic layered compound and an organometal compound etc.

Kaolinite, dickite, nacrite, halloysite, antigorite, chrysotile, pyrophyllite, montmorillonite, beidellite, hectorite, saponite, stevensite, tetrasilicic mica, Na-taeniolite, white mica, margarite, talc, vermiculite, bronze mica, xanthophyllite and chlorite etc. can be used as the inorganic layered compound. The inorganic layer compound can be used regardless of whether it is a natural mineral or a synthesized material. Especially, montmorillonite is preferable as the inorganic layered compound with respect to gas barrier properties, dispersibility, suitability for mixing with the fine cellulose fiber and strength of the resultant formed film. As there is no particular limitation to an additive amount of the inorganic layered compound, the additive amount can be determined within the range of 0.01-99% according to specifications required for the resultant film. It is preferable that the additive amount is in the range of 0.01-67% particularly if considering adhesiveness in the resultant laminated body.

The organometal compound is an organometal compound represented as the following general formula or its hydrolysate or polymer.

$A_m M(OR)_{n-m}$, where $A_m$ includes one (the case of m=1) or more (the case of m≥2) of carbon main chain having a carbon number in the range from 1 to 10, M is a metal element, R is an alkyl group, n is an oxidation number of the metal element, and m ($0 \leq m < n$) is a number of the substituent A.

Examples of the organometal compound are a metal alkoxide of Ti, Zr or Si, and a silicon alkoxide has particularly good performance. Specifically, tetraalkoxides such as tetramethoxysilane, tetraethoxysilane and tetrapropoxysilane etc. and their polymers, trialkoxysilanes such as trimethoxysilane, triethoxysilane and tripropoxysilane etc. and their polymers, dialkoxides such as dimethoxysilane and diethoxysilane etc. and their polymers, alkoxysilanes having a C—Si bond such as methyltrimethoxysilane, methyltriethoxysilane and methyldimethoxysilane etc., other alkoxysilanes having a functional group such as vinyltrimethoxysilane, vinyltriethoxysilane, γ-methacryloxypropyltrimethoxysilane, γ-glycidoxypropyltrimethoxysilane, β-(3,4-epoxycyclohexyl)ethyltrimethoxysilane, γ-mercaptopropyltrimethoxysilane, γ-aminopropyltriethoxysilane and N-β-(aminoethyl)-γ-aminopropyltrimethoxysilane etc. are examples.

Next, the substrate 1 is described. As there is no particular limitation to the substrate, an appropriate sheet of substrate selected from various generally used substrates (including substrate films) can be used as the substrate 1 depending on the intended use. Examples of such substrates are a paper, a paper board, a biodegradable plastic such as PLA and polybutylsuccinate etc., a polyolefin resin (such as polyethylene and polypropylene etc.), a polyester resin (such as polyethylene terephthalate, polybutylene terephthalate, polyethylene naphthalate and PLA etc.), a polyamide resin (such as nylon-6 and nylon-66 etc.), a polyvinylchloride resin, a polyimide resin, a copolymer of any two or more monomers which are included in the polymer cited above, etc. The substrate may include publicly-known additives such as an antistat, an ultraviolet absorber, a plasticizer, a lubricant and a colorant etc.

In particular, it is preferable to use a substrate made of a material derived from biomass such as a paper, a biodegradable plastic like PLA and polybutylsuccinate, a bio-polyethylene (renewable polyethylene), etc. since the advantage of the fine cellulose fiber, which is a naturally derived material and loads a low environmental burden, becomes maximized.

The substrate may undergo a surface treatment such as corona treatment, plasma treatment, ozone treatment and flame treatment etc. on the surface. The surface treatment improves coatability and/or adhesiveness of a layer coated on the surface (for example, the fine cellulose fiber layer). A publicly known method can be employed as the surface treatment.

The substrate can have a thickness appropriate for use or application of the laminated material. For example, in the case where the laminated material is used as a wrapping material, the thickness is normally in the range of 5-200 µm and preferably in the range of 10-100 µm. A thickness in the range of 10-30 µm is the best for costs and resource saving.

In particular, the laminated body of the present invention contains a carboxy group, sulfonate group, amino group or hydroxyl group in the substrate, the anchor layer and/or the fine cellulose fiber layer. It is preferable that a material of the substrate contains the carboxy group or the sulfonate group and the amino group or the hydroxyl group because adhesiveness, wettability and temporal stability are improved by polarities of these groups attracting each other or by reaction with a reactive compound contained in the anchor layer described later. A polyester resin is particularly preferable.

Although a polyester resin normally retains only a few carboxy groups at the end of the polymer, a polyester resin in which modification and/or reformation are performed on the polymer so as to introduce more carboxy groups or sulfonate groups etc. on the surface or even to the interior portion is more preferable since such a polyester resin has a high effect of improved adhesiveness, wettability and temporal stability. Among polyester resins, a PLA is preferably used as the substrate in order to take full advantage of the fine cellulose fiber, which is a naturally derived material and loads a low environment burden as is previously described.

Next, the anchor layer 2 is described. The laminated body of the present invention has a feature of having an anchor layer. By having the anchor layer, it is possible to solve the problem of the low adhesion to the substrate caused by a fact that the fine cellulose fiber contained in the fine cellulose fiber layer has rigid characteristics with a high elastic modulus, has a contact with the substrate by small areas due to its fibrous shape and has low reactivity. In addition, it is possible to solve the problem of the substrate in terms of repellency, wettability and coatability which is caused by a fact that an aqueous medium is used as the dispersion medium of the fine cellulose fiber. Furthermore, it is possible to solve the problem that adhesiveness in the resultant formed film becomes poor since the substrate and a coated layer thereon degrade as time passes due to chemical instability, bleeding of a low molecular-weight molecule, crystallization and/or surface degradation of the substrate. In other words, the anchor layer makes it possible to evenly coat the coating liquid consisting of the aqueous dispersion liquid of the fine cellulose fiber and to ensure adhesion to the substrate, as well as to prevent time degradation of the substrate, the fine cellulose fiber and their adhesiveness.

In addition, it is preferable that the anchor layer contains at least one resin having carboxy groups, sulfonate groups, amino groups or hydroxyl groups. In the case where such a resin is contained, adhesion, wettability and temporal stability are improved because polarities of the carboxy groups, sulfonate groups, amino groups or hydroxyl groups attract each other and/or react with a reactive compound contained in the anchor layer. Particularly in the case where the resin contains carboxy groups, these are remarkably improved as a result of the interactions between them, covalent bonds formed by the reaction with the reactive compound contained in the anchor layer, and a synergetic effect of these. The resin contained in the anchor layer may have two or more of the functional groups cited above although it is not necessary for it to have more than one of these. In addition, the resin may have functional groups other than these cited above unless the effect mentioned above is inhibited.

It is possible to use a polyester resin, a polyamide resin, a polyimide resin, a polyurethane resin, a polyacrylic resin, a polyolefin resin and their copolymers etc. as the resin having these functional groups. The resin may be denatured with acid, modified by oxidation treatment, or chemically treated to introduce functional groups cited above or other groups. Among these, particularly a polyurethane resin, a polyacrylic resin and a polyester resin have a high effect of improving adhesion to the fine cellulose fiber and wettability. In addition, in the case where the substrate is a polyester resin, if the anchor layer is also a polyester resin, it is possible to achieve a remarkable effect of improving adhesion between layers and temporal stability because of interactions between polarities, intermolecular forces, covalent bonds formed by the reaction with the reactive compound contained in the anchor layer, and a synergetic effect of these. For example, in the case where a PLA is used as the substrate and a PLA resin is used as the anchor layer, it is possible to improve adhesion between the fine cellulose fiber layer and the substrate of the PLA although the PLA substrate has poor adhesion to most coated layers. Although it is sufficient that at least one of such resins is contained in the anchor layer, two or more of such resins may also be contained. Resins other than such resins may also be contained unless the effect mentioned above is inhibited.

In addition, the resin contained in the anchor layer has an acid value of preferably 12 or more, more preferably 20 or more. The acid value influences the amount of the functional groups and/or the effect described above. If the acid value is less than 12, the effect with respect to adhesiveness, wettability and temporal stability is low. If the acid value is 20 or more, not only the effect with respect to these is high but also reactivity of the resin to the compound contained in the anchor layer is improved. If the acid value is 50 or more, the effect of the interaction between the polarities becomes remarkable even if no reactive compound or only a small amount of reactive compound is contained. The acid value, however, is preferably in the range of 12-200 since it may adversely affect waterproofness and blocking tendency if it is more than 200.

In addition, in the case where the resin contained in the anchor layer has a carboxy group, it is possible to obtain various salts of the carboxy group using a metal hydroxide such as sodium hydroxide and potassium hydroxide etc., an organic ammonium such as diethyl ammonium etc., and so on. The salts of the carboxy group significantly influence solubility of the resin and kinds of solvent to be used. Particularly in the case where the anchor layer contains a reactive compound described later, it is preferable if the carboxy group is in an ammonium salt or an amine salt since the reaction proceeds at a low temperature. Examples of the amine salt are a triethylamine salt and a tetramethylamine salt etc.

In addition, it is also preferable if the carboxy group contained in the anchor layer is in a state of the carboxy group, namely "—COOH", without forming a salt because the reaction proceeds at a low temperature.

In addition, the anchor layer preferably has a thickness in the range from 3 nm to 10 μm. If the thickness is smaller than 3 nm, the effect of coatability, temporal stability and particularly adhesiveness is hardly achieved since the thickness is smaller than a fiber width of the fine cellulose fiber and an amount of contact decreases. On the other hand, if the thickness exceeds 10 μm, it is inefficient due to an excessive thickness, and in addition, the anchor layer and the fine cellulose fiber layer distort and/or deform causing a warp and/or curl of the resultant laminated body. It is preferable that the anchor layer has a thickness from 3 nm to 5 μm in order to prevent the warp and/or curl. It is more preferable that the anchor layer has a thickness from 3 nm to 2 μm particularly considering costs and drying efficiency.

Furthermore, it is preferable that the anchor layer contains a reactive compound. The reactive compound preferably reacts with the functional group such as carboxy group and the hydroxyl group etc. in the fine cellulose fiber and with the functional group contained in the substrate. Adhesion between the layers, coatability and temporal stability are achieved by a synergetic effect of these. A compound having a carbodiimide group, oxazoline group, isocyanate group, epoxy group and/or amino group etc. is preferably used as the reactive compound although there is no particular limitation to the reactive compound. Among these, the compound having a carbodiimide group, oxazoline group and/or isocyanate group has a high level of reactivity to a substrate which significantly expands and/or contracts with heat such as polyester, polyolefin and particularly PLA etc. because it efficiently reacts with a hydroxyl group and/or carboxy group etc. contained in the substrate, the anchor layer and/or the fine cellulose layer at a low temperature.

In addition, the carbodiimide group and oxazoline group makes it possible to stabilize adhesion between the substrate such as PLA etc. and the anchor layer and/or the fine cellulose fiber layer as time passes because they moderately reacts at a low temperature, for example room temperature. Particularly in the case where drying in forming the anchor layer is performed at a low temperature of 80° C. or lower and the fine cellulose fiber layer is arranged thereon, unreacted carbodiimide groups and/or oxazoline groups remaining in the anchor layer prevent the substrate, the fine cellulose fiber layer and/or their adhesiveness from degrading. It is more preferable that drying in forming the anchor layer is performed at a temperature of 60° C. or lower since then the effect of preventing the degradation is remarkable and particularly in the case where a substrate with low heat resistance such as PLA etc. is used as the substrate, it is possible to minimize the distortion and/or deformation.

In addition, it is preferable that the reactive compound has a molecular weight of 1000 or more. In the case where the reactive polymer has a molecular weight less than 1000, the anchor layer becomes brittle and its adhesion to the layer of the rigid fine cellulose fiber or the hard substrate is liable to be unstable and weak. For example, in the case where a reactive compound having a molecular weight more than 1000 is used, laminate strength, that is strength of the weakest layer in the thickness direction of the laminate body, of 1.5 N or higher is ensured.

In addition, although there is no particular limitation to the upper limit of the molecular weight of the reactive compound, the molecular weight is selected adequately in terms of viscosity of the coating liquid for forming the anchor layer, strength of the anchor layer and heat characteristics of the same.

Besides the anchor layer 2 and the fine cellulose fiber layer 3, the laminated body 10 of the present invention may also include various functional layers such as an inorganic deposited layer and/or a thermoplastic resin layer which can adhere by thermal welding etc.

The inorganic deposited layer is arranged for the purpose of improving gas barrier properties or water vapor impermeability of the laminated body, and is made of for example aluminum oxide, magnesium oxide and/or silicon oxide etc. A vacuum deposition method, sputtering method and plasma-enhanced vapor deposition method etc. are examples of a method for forming the inorganic deposited layer. It is preferable that the inorganic deposited layer is arranged on a surface of the fine cellulose fiber layer.

Figure 2:
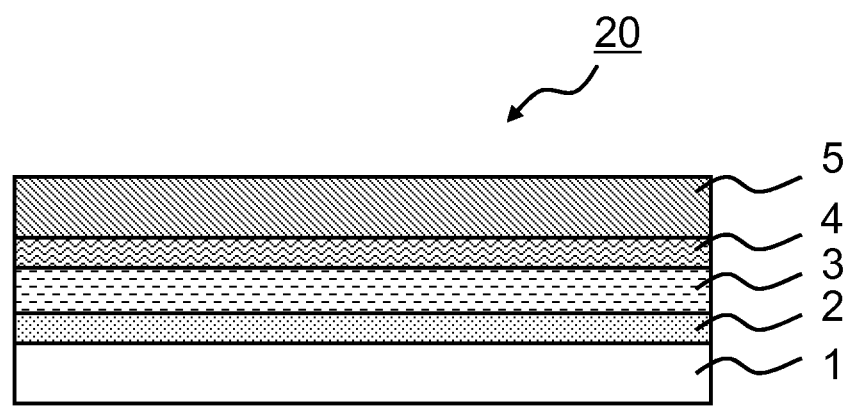
FIG. 2 is a cross sectional schematic diagram of a laminated body of another embodiment of the present invention.

The thermoplastic resin layer which can adhere by thermal welding is arranged as a sealing layer when fabricating a saclike wrapped object etc. using the laminated body of the present invention. FIG. 2 illustrates a laminated body 20 having the thermoplastic resin layer of the present invention. The thermoplastic resin layer 5 is laminated on the fine cellulose fiber layer 3 via an adhesion layer 4, and the fine cellulose fiber layer 3 is laminated on a surface of the substrate 1 via an anchor layer 2.

A film which can adhere by thermal welding and is made of a resin such as polyethylene, polypropylene, ethylene-vinyl acetate copolymer, ethylene-methacrylate copolymer, ethylene-methacrylate ester copolymer, ethylene-acrylate copolymer, ethylene-acrylate ester copolymer and their metal-bridged resins etc. can be used as the thermoplastic resin layer 5.

Generally, the thermoplastic resin layer can be formed on the fine cellulose fiber layer by using a dry laminating method, in which a film corresponding to the thermoplastic resin layer is pasted on a surface of the fine cellulose fiber layer with an adhesive agent such as a two-component curable urethane resin etc. The thermoplastic resin layer can also be laminated by other conventional methods such as a coating method, non-solvent laminating method, wet laminating method and extrusion laminating etc.

In this way, it is preferable that the thermoplastic resin layer is arranged on a surface of the fine cellulose fiber layer via an adhesion layer. In addition, layers other than the adhesion layer such as a print layer etc. may also be arranged between the fine cellulose fiber layer and the thermoplastic resin layer.

EXAMPLES

Examples and comparative examples are described below. Incidentally, the present invention is not limited by these examples.
<Preparation Method 1 of Oxidized Cellulose>
Bleached softwood pulp generally available was used as the cellulose.

60 g (weighed in terms of absolute dry mass) of the cellulose was added to 1000 g of distilled water, stirred to swell with water and fiberized by a mixer. Then, 2200 g of distilled water and a solution in which 0.6 g of TEMPO and 6 g of sodium bromide had been preliminarily dissolved in 400 g of distilled water were further added to initiate the oxidation reaction. Temperature was maintained at 20° C. or lower throughout the reaction. Although pH of the reaction system tended to decline while the reaction proceeded, the pH was adjusted to 10 by continuously adding 0.5 M of NaOH(aq). Four hours after the reaction started, the reaction was terminated by adding 60 g of ethanol. Subsequently, 0.5 M of HCl(aq) was dripped into the reaction liquid until it had a pH as low as 2. The reaction liquid was filtered with a nylon mesh, and its solid content was further washed with water a couple of times to remove the reagents and by-products. As a result, oxidized cellulose 1 with water having a solid content of 7% was obtained.
<Preparation Method 2 of Oxidized Cellulose>
Oxidized cellulose 2 was obtained by a method similar to the preparation method 1 of oxidized cellulose except for adopting a reaction temperature of 30° C.
<Measurement of Quantity of Introduced Functional Groups>
0.2 g (in terms of absolute drying mass) of freeze-dried oxidized cellulose was weighed and placed in a beaker, and distilled water was added to obtain a 60 g solution. After adding 0.5 mL of 0.1 M NaCl(aq) and further adding 0.5 M of HCl(aq) to obtain a pH of 2, the solution underwent conductometric titration by dropwise adding 0.5 M of NaOH(aq). The titration was continued until the pH was increased to about 11. The consumed amount for neutralizing weak acids corresponded to the quantity of the carboxy groups. It was found that the carboxy group contents in the oxidized cellulose 1 and the oxidized cellulose 2 were 1.6 mmol/g and 2.5 mmol/g, respectively, by determining an NaOH additive amount from the conductometric curve.

Next, 2 g (in terms of absolute drying mass) of wet oxidized cellulose was admixed with 20 mL of 0.5 M acetic acid (aq), 60 mL of distilled water and 1.8 g of sodium chlorite. After being adjusted to obtain a pH of 4, and the mixture was reacted for 48 hours. It was found that the carboxy group contents after the reaction were 1.8 mmol/g and 2.6 mmol/g, respectively, by measuring the carboxy group contents in the same method as is described above. As a result, aldehyde contents were calculated as 0.2 mmol/g and 0.1 mmol/g, respectively. The carboxy group contents and the aldehyde contents in the oxidized cellulose 1 and in the oxidized cellulose 2 respectively are summarized in Table 1.

TABLE 1

| No. of oxidized cellulose | Carboxy group content (mmol/g) | Aldehyde group content (mmol/g) |
|---|---|---|
| 1 | 1.6 | 0.2 |
| 2 | 2.5 | 0.1 |

<Preparation of Fine Cellulose Fiber Dispersion Liquid 1>
400 g of oxidized cellulose suspension having a pH of 10 was prepared by adding distilled water and 0.1 M of $NH_3$(aq) to 57.14 g of the oxidized cellulose having a solid content concentration of 7% (solid content: 4 g) which is obtained as is described above. The resultant suspension was treated by a mixer having a rotary blade for 60 minutes so as to obtain fine cellulose fiber dispersion liquid 1.
<Preparation of Fine Cellulose Fiber Dispersion Liquid 2>
400 g of oxidized cellulose suspension having a pH of 6.8 was prepared by adding distilled water and 0.5 M of NaOH (aq) to 57.14 g of the oxidized cellulose having a solid content concentration of 7% (solid content: 4 g) which is obtained as is described above. The resultant suspension was treated by a high-pressure homogenizer so as to obtain fine cellulose fiber dispersion liquid 2.
<Preparation of Fine Cellulose Fiber Dispersion Liquid 3>
400 g of oxidized cellulose suspension having a pH of 8 was prepared by adding distilled water, 2 g (in terms of solid content) of an inorganic layered mineral (montmorillonite)

and 0.5 M of NaOH(aq) to 57.14 g of the oxidized cellulose having a solid content concentration of 7% (solid content: 4 g) which is obtained as is described above. The resultant suspension was treated by a mixer having a rotary blade for 20 minutes so as to obtain fine cellulose fiber dispersion liquid 3.

The oxidized celluloses, alkalis and additives used in preparing the fine cellulose fiber dispersion liquids 1 to 3 are summarized in Table 2. In addition, number average fiber diameters were estimated as an average height of 20 points observed with an atomic force microscope (AFM). The result of the number average fiber diameters are also shown in the Table 2.

TABLE 2

| No. of fine cellulose fiber dispersion liquid | No. of oxidized cellulose | Alkali | Additive | Number average fiber diameter of fine cellulose fiber (μm) |
|---|---|---|---|---|
| 1 | 1 | $NH_3$ | None | 0.0026 |
| 2 | 1 | NaOH | None | 0.0013 |
| 3 | 2 | NaOH | Montmorillonite | 0.0019 |

<Coating Liquid for Forming Anchor Layer>

Coating liquids for forming an anchor layer 1 to 10 were prepared by selecting and mixing 100 wt % of one of the resins recited below and 10 wt % of one of the additives recited below. Combination of the resins and the additives along with the solvents used and solid content concentrations in the coating liquids for forming an anchor layer is summarized in Tables 3A and 3B.

<Resins 1 to 7>

Resin 1: Nichigo-POLYESTER WR-961 (a polyester having carboxy groups, ammonium salts, acid value: 60-70) made by Nippon Synthetic Chemical Industry Co., Ltd.

Resin 2: Nichigo-POLYESTER WR-901 (a polyester having sodium sulfate groups, acid value: 5 or less) made by Nippon Synthetic Chemical Industry Co., Ltd.

Resin 3: ARROWBASE SB-1010 (an acid-denatured polyolefin having carboxy groups, ammonium salts, acid value: 12 or more) made by Unitika Ltd.

Resin 4: NT-HiLamic (a polyurethane) made by Dainichiseika Color & Chemicals Mfg. Co., Ltd.

Resin 5: VYLOECOL BE-600 (a PLA) made by Toyobo Co., Ltd.

Resin 6: A chitosan made by Dainichiseika Color & Chemicals Mfg. Co., Ltd.

Resin 7: DIANAL BR-107 (an acrylic resin) made by Mitsubishi Rayon Co., Ltd.

<Additives 1 to 3>

Additive 1: SV-02 (a water-soluble carbodiimide, molecular weight: 1000 or more) made by Nisshinbo Chemical Inc.

Additive 2: EPOCROS WS-500 (an oxazoline, acid value: 5 or less) made by Nippon Shokubai Co., Ltd.

Additive 3: TAKENATE A65 (an isocyanate) made by Mitsui Chemicals Inc.

Additive 4: EX614 (an epoxide) made by Nagase Chemtex Corp.

TABLE 3A (continued to Table 3B)

| No. of coating liquid for forming anchor layer | Resin | | |
|---|---|---|---|
| | No. | Functional group | Type of resin |
| 1 | 1 | Carboxy group | Polyester resin |
| 2 | 1 | Carboxy group | Polyester resin |
| 3 | 1 | Carboxy group | Polyester resin |
| 4 | 1 | Carboxy group | Polyester resin |
| 5 | 2 | Sulfonate group | Polyester resin |
| 6 | 3 | Carboxy group | Polyolefin resin |
| 7 | 4 | Hydroxyl group | Polyurethane resin |
| 8 | 5 | Hydroxyl group | Polyester resin |
| 9 | 6 | Amino group | Chitosan |
| 10 | 7 | — | Acrylate resin |

TABLE 3B (continued from Table 3A)

| No. of coating liquid for forming anchor layer | Additive | | Solvent | Solid content concentration (%) |
|---|---|---|---|---|
| | No. | Functional group | | |
| 1 | — | — | Water | 30 |
| 2 | 1 | Carbodiimide group | Water | 30 |
| 3 | 2 | Oxazoline group | Water | 30 |
| 4 | 3 | Isocyanate group | Water | 30 |
| 5 | 1 | Carbodiimide group | Water | 30 |
| 6 | 2 | Oxazoline group | Water | 30 |
| 7 | 3 | Isocyanate group | Ethyl acetate | 30 |
| 8 | 2 | Oxazoline group | Ethyl acetate | 30 |
| 9 | 4 | Epoxy group | Water | 2 |
| 10 | — | — | Ethyl acetate | 30 |

Examples 1 to 9

25 μm thick PLA films which had undergone a corona treatment on the surface were prepared as the substrate. Each of the coating liquids 1 to 9 for forming an anchor layer was respectively coated on the corona-treated surface of the substrate by using a bar coater. Afterwards, the anchor layer with a thickness of about 0.2 μm was formed by drying the substrate at 60° C. for 20 minutes.

After the fine cellulose fiber dispersion liquid 1 was coated on the anchor layer by using a bar coater, a fine cellulose fiber layer with a thickness of about 0.2 μm was formed by drying it at 60° C. for 20 minutes.

Furthermore, a 70 μm thick polypropylene film, which was a thermoplastic resin film and was able to adhere by thermal welding, was pasted on the fine cellulose fiber layer by a dry laminating method using an urethanepolyol adhesive agent. As a result, a laminated body having a structure of "the thermoplastic resin layer/the adhesion layer/the fine cellulose fiber layer/the anchor layer/the substrate" was obtained.

Examples 10 to 12

25 μm thick polyethylene terephthalate films which had undergone a corona treatment on the surface were prepared as the substrate. Each of the coating liquids 2 to 4 for forming an anchor layer was respectively coated on the corona-treated surface of the substrate by using a bar coater. Afterwards, the anchor layer with a thickness of about 0.2 μm was formed by drying the substrate at 80° C. for 20 minutes.

After the fine cellulose fiber dispersion liquid 2 was coated on the anchor layer by using a bar coater, a fine cellulose fiber layer with a thickness of about 0.2 μm was formed by drying it at 100° C. for 20 minutes.

Furthermore, a 70 μm thick polypropylene film, which was a thermoplastic resin film, was pasted on the fine cellulose fiber layer by a dry laminating method using an urethanepolyol adhesive agent. As a result, a laminated body having a structure of "the thermoplastic resin layer/the adhesion layer/the fine cellulose fiber layer/the anchor layer/the substrate" was obtained.

Example 13

20 μm thick stretched polypropylene films which had undergone a corona treatment on the surface were prepared as the substrate. The coating liquid 4 for forming an anchor layer was coated on the corona-treated surface of the substrate by using a bar coater. Afterwards, the anchor layer with a thickness of about 1 μm was formed by drying the substrate at 80° C. for 20 minutes.

After the fine cellulose fiber dispersion liquid 3 was coated on the anchor layer by using a bar coater, a fine cellulose fiber layer with a thickness of about 0.5 μm was formed by drying it at 80° C. for 20 minutes.

Furthermore, a 70 μm thick polypropylene film, which was a thermoplastic resin film, was pasted on the fine cellulose fiber layer by a dry laminating method using an urethanepolyol adhesive agent. As a result, a laminated body having a structure of "the thermoplastic resin layer/the adhesion layer/the fine cellulose fiber layer/the anchor layer/the substrate" was obtained.

Comparative Example 1

A laminated body was obtained in the same way as the Examples 1 to 9 except that the anchor layer was not formed on the corona-treated surface of the substrate and the fine cellulose fiber dispersion liquid 1 was directly coated thereon by using the bar coater.

Comparative Example 2

A laminated body was obtained in the same way as the Examples 10 to 12 except for using not the coating liquids 2 to 4 for forming an anchor layer but the coating liquid 9 for forming an anchor layer. Incidentally, since coatability of the coating liquid 9 was bad and it was difficult to directly coat the fine cellulose fiber dispersion liquid on the anchor layer as originally formed, an excessive corona treatment was performed on a surface of the anchor layer before forming the fine cellulose fiber layer.

<Coatability Evaluation>

Regarding the coating process of the fine cellulose fiber dispersion liquid in manufacturing the laminated body in the Examples 1 to 13 and the Comparative examples 1 and 2, wettability of the fine cellulose fiber dispersion liquid was good and neither repellency nor coating unevenness etc. was observed in the Examples 1 to 13. In addition, wettability of the fine cellulose fiber dispersion liquid was adequate to some extent in the Comparative example 2 due to the excessive corona treatment on a surface of the anchor layer.

On the other hand, wettability was bad and repellency and coating unevenness was observed in the Comparative example 1.

<Measurement of Oxygen Permeability Under a Normal Condition>

Oxygen barrier properties under a normal condition were evaluated by measuring oxygen permeability ($cm^3/m^2/day/atm.$) of the laminated body at 25° C. under an atmosphere of 40% RH using an oxygen permeation rate test system MOCON OX-TRAN 2/21 (made by Modern Controls, Inc.).

<Measurement of Water Vapor Permeation Rate Under a High Humidity Condition>

Moisture barrier properties under a high humidity condition were evaluated by measuring water vapor permeability ($g/m^2/day$) of the laminated body at 40° C. under an atmosphere of 90% RH by a cup method in conformity to JIS (Japanese Industrial Standards) 20208.

<Adhesiveness Test>

The laminated body was cut in a rectangle specimen with a width of 15 mm and a length of 100 mm, and a T-way stripping strength was measured at a stripping rate of 300 mm/min.

<Temporal Stability Test>

After the laminated body was kept in an environment of a temperature of 40° C. and humidity of 90% RH for one week, its adhesiveness was measured in the same method as the adhesiveness test described above.

<Result>

Results of the evaluation described above are summarized in Tables 4A and 4B.

TABLE 4A (continued to Table 4B)

| Example/ Comparative example | No. of coating liquid for forming anchor layer | No. of fine cellulose fiber dispersion liquid | Oxygen permeability (normal condition) [$cm^3/m^2/day/atm.$] |
|---|---|---|---|
| Example 1 | 1 | 1 | 6.5 |
| Example 2 | 2 | 1 | 5.8 |
| Example 3 | 3 | 1 | 3.9 |
| Example 4 | 4 | 1 | 5.5 |
| Example 5 | 5 | 1 | 6.3 |
| Example 6 | 6 | 1 | 5 |
| Example 7 | 7 | 1 | 4.8 |
| Example 8 | 8 | 1 | 6.2 |
| Example 9 | 9 | 1 | 5.1 |
| Example 10 | 2 | 2 | 1.5 |
| Example 11 | 3 | 2 | 0.8 |
| Example 12 | 4 | 2 | 2.3 |
| Example 13 | 4 | 3 | <0.1 |
| Comparative example 1 | — | 1 | 15.1 |
| Comparative example 2 | 9 | 2 | 8.6 |

TABLE 4B (continued from Table 4A)

| Example / Comparative example | Water vapor permeability (high humidity condition) [$g/m^2/day$] | Adhesiveness test [N] | Temporal stability test [N] |
|---|---|---|---|
| Example 1 | 3 | 1.2 | 1.1 |
| Example 2 | 2.5 | 2.4 | 3.2 |
| Example 3 | 1.2 | 5.2 | 4.7 |
| Example 4 | 3.9 | 4.3 | 3.5 |
| Example 5 | 3.2 | 0.8 | 0.5 |
| Example 6 | 2.2 | 3.2 | 2.7 |
| Example 7 | 3.4 | 2.4 | 1.5 |
| Example 8 | 4 | 1.5 | 0.8 |

TABLE 4B-continued (continued from Table 4A)

| Example / Comparative example | Water vapor permeability (high humidity condition) [g/m²/day] | Adhesiveness test [N] | Temporal stability test [N] |
|---|---|---|---|
| Example 9 | 4.5 | 0.9 | 0.7 |
| Example 10 | 2.4 | 1.1 | 0.6 |
| Example 11 | 2.1 | 1.3 | 1 |
| Example 12 | 2.3 | 1.4 | 0.9 |
| Example 13 | 1.1 | 0.8 | 0.5 |
| Comparative example 1 | 7.6 | 0.1 | 0 |
| Comparative example 2 | 5.5 | 0.1 | 0 |

Judging from the above results, it can be concluded that the laminated body of the present invention had such a good appearance that wettability or coatability is good and the fine cellulose fiber layer had no inhomogeneity as well as such good barrier properties that the oxygen permeation rate and water vapor permeation rate was low.

In addition, it was also shown in the results that the laminated bodies of the examples of the present invention had good adhesiveness and temporal stability. Incidentally, these effects are greater when the anchor layer contains the reactive compound and/or the anchor layer is formed by drying the coating liquid for forming an anchor layer at a temperature of 60° C. or lower.

The laminated body of the present invention can be used as a film sheet and as a forming material of bottles etc. which prevent oxygen and water vapor from permeating in order to protect the content, for example, in a field of wrapping materials for foods and drugs etc.

What is claimed is:

1. A laminated body comprising:
   a substrate;
   an anchor layer on a surface of said substrate; and
   a cellulose fiber layer on said anchor layer, said cellulose fiber layer containing a cellulose fiber having carboxy groups, wherein
   said anchor layer contains a resin having at least one functional group selected from the group consisting of carboxy group, sulfonate group, amino group and hydroxyl group,
   wherein said cellulose fiber is oxidized cellulose in which said carboxy groups are introduced by an oxidation reaction and a content of said carboxy groups in said cellulose fiber is in the range of 0.1-5.5 mmol/g,
   wherein said cellulose fiber has a number average fiber diameter in the range of 0.001-0.200 µm, and
   wherein said anchor layer contains another resin having a carboxy group, and said carboxy group forms an ammonium salt or an amine salt.

2. The laminated body according to claim 1, wherein said carboxy groups in said cellulose fiber form ammonium salts or amine salts.

3. The laminated body according to claim 1, wherein said resin contained in said anchor layer is a polyester resin, a polyamide resin, a polyurethane resin, a polyacrylic acid resin, a polyolefin resin or a copolymer of any combination thereof.

4. The laminated body according to claim 3, wherein said anchor layer further contains a reactive compound having a carbodiimide group, oxazoline group, isocyanate group or epoxy group.

5. The laminated body according to claim 4, wherein said substrate consists of a polyester resin and wherein said anchor layer contains a polyester resin having a carboxy group and a reactive compound having a carbodiimide group or an oxazoline group.

6. The laminated body according to claim 5, wherein said polyester resin of said substrate is a polylactate.

7. The laminated body according to claim 4, wherein said reactive compound has a molecular weight of 1000 or more.

8. The laminated body according to claim 4, wherein said resin contained in said anchor layer has an acid value of 12 or more.

9. The laminated body according to claim 8, wherein said anchor layer has a thickness in the range from 3 nm to 10 µm.

* * * * *